United States Patent

Piotrowski

[11] Patent Number: 5,930,879
[45] Date of Patent: *Aug. 3, 1999

[54] SPLIT RING ASSEMBLY APPARATUS AND METHOD

[75] Inventor: Eugene G. Piotrowski, Stevens Point, Wis.

[73] Assignee: Worth Manufacturing Co., Stevens Point, Wis.

[*] Notice: This patent issued on a continued prosecution application filed under 37 CFR 1.53(d), and is subject to the twenty year patent term provisions of 35 U.S.C. 154(a)(2).

[21] Appl. No.: 08/704,282

[22] Filed: Aug. 28, 1996

[51] Int. Cl.⁶ .............................. B23P 19/04; B23Q 7/10
[52] U.S. Cl. ............................................. 29/227; 29/240.5
[58] Field of Search .................. 29/227, 229, 426.6, 29/240.5, 225

[56] References Cited

U.S. PATENT DOCUMENTS 3,340,595  9/1967  Hoadley .
3,596,341  8/1971  Herkner .
5,077,877  1/1992  Piotrowski .

Primary Examiner—Joseph M. Gorski
Attorney, Agent, or Firm—Andrus, Sceales, Starke & Sawall

[57] ABSTRACT

A split ring assembly apparatus includes a rotatable drive spindle operating within the bore of a cylindrical housing and having a drive pin adapted to engage the gap in one face of a split ring positioned axially on one end of the spindle to rotate the ring. An opening wedge is biased into engagement with the opposite face of the split ring and has an edge positioned to enter the other ring gap in response to ring rotation to cause the ring to progressively open along its split.

9 Claims, 4 Drawing Sheets

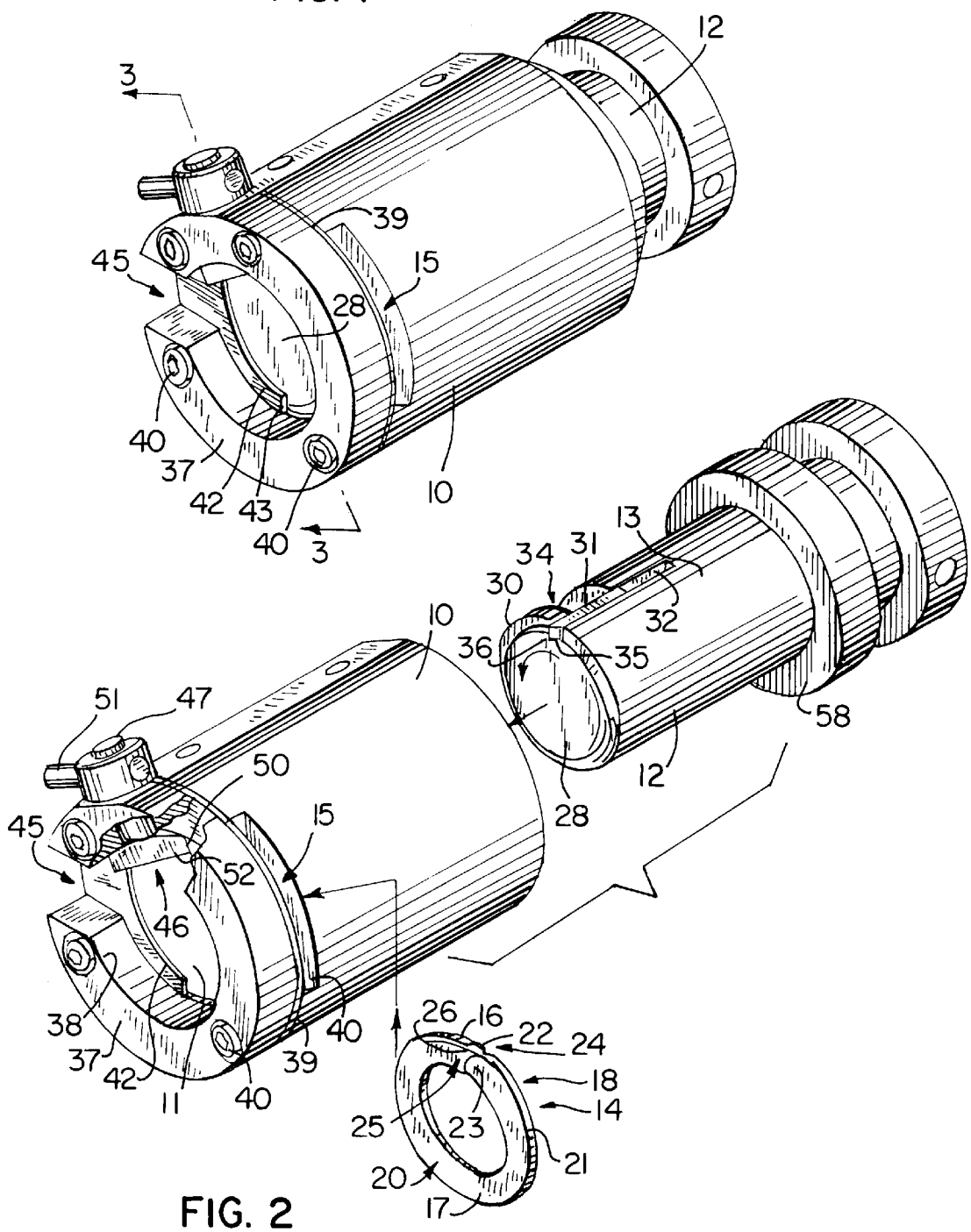

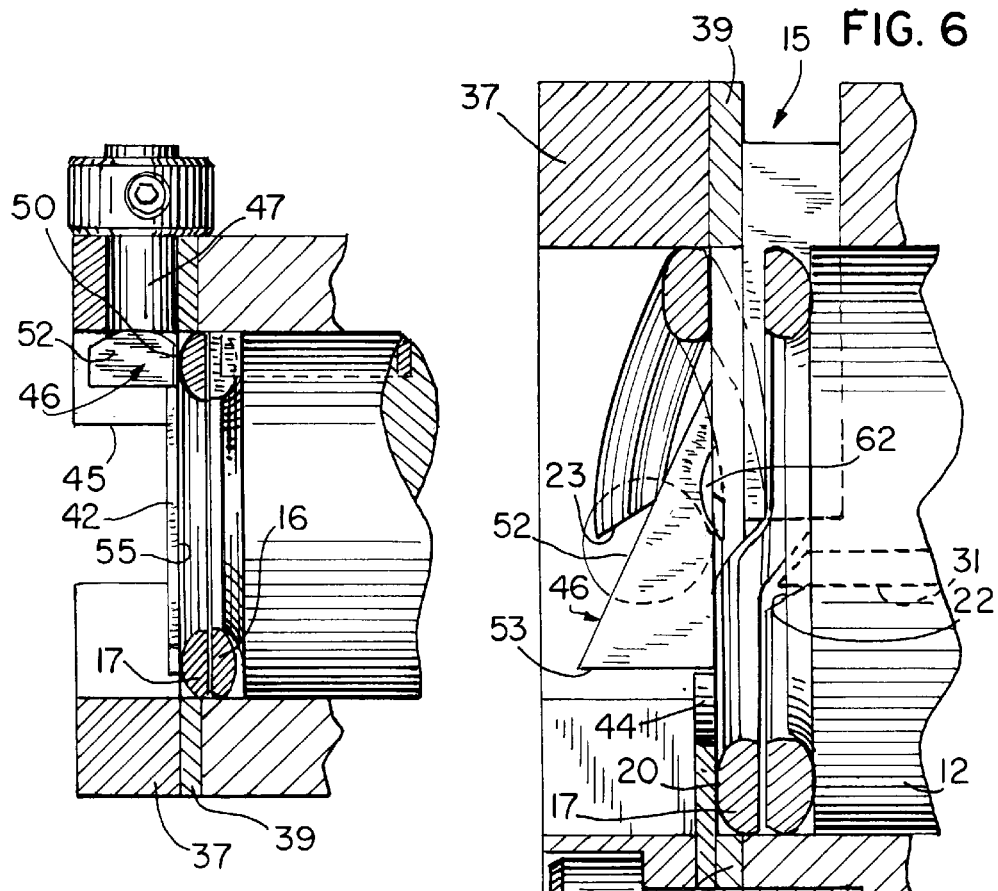
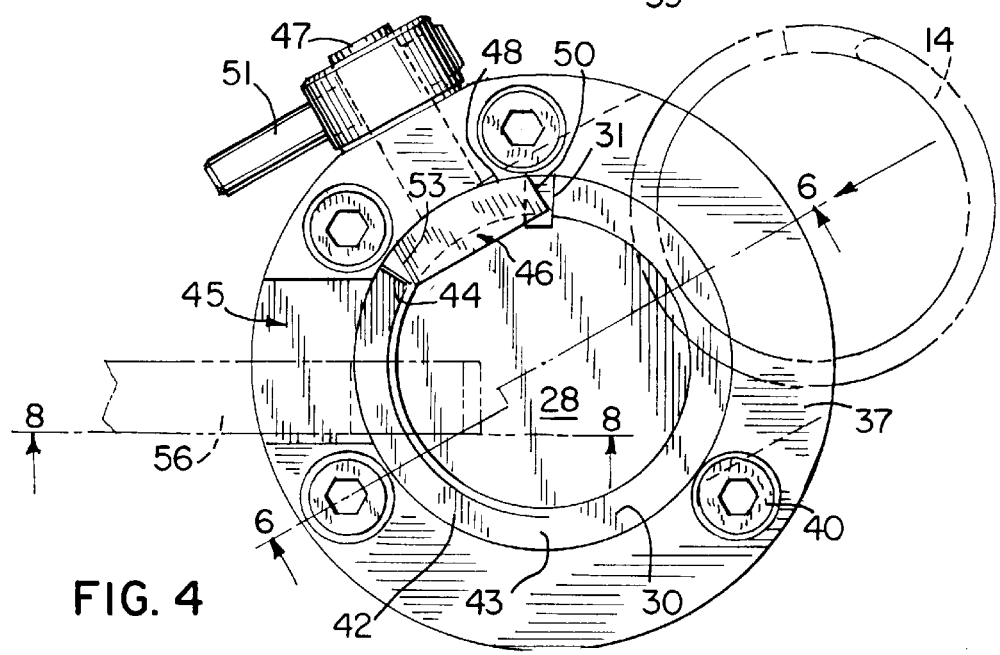

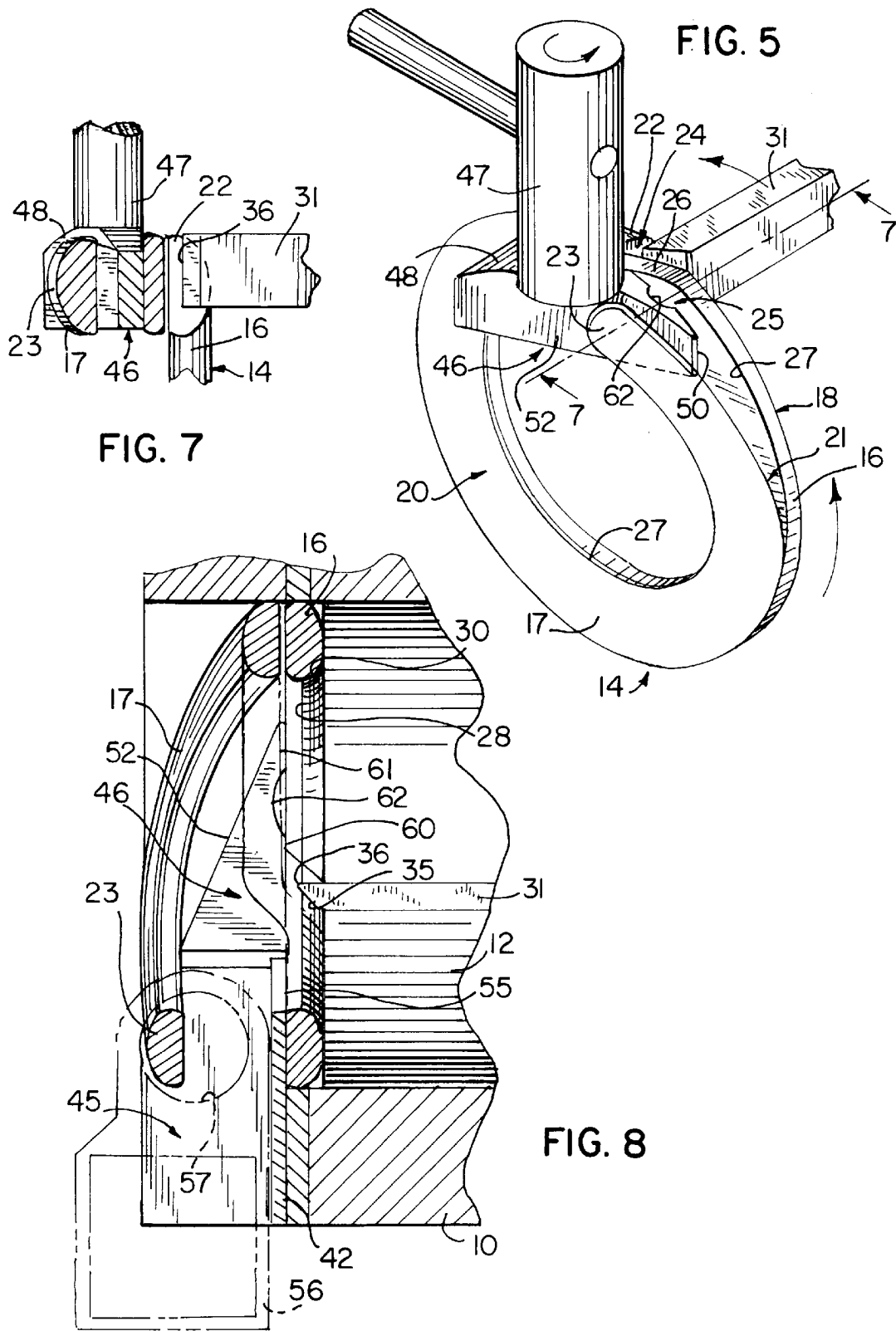

SPLIT RING ASSEMBLY APPARATUS AND METHOD

BACKGROUND OF THE INVENTION

The present invention pertains to an apparatus for rotating and simultaneously opening a split ring to facilitate attachment of an object to the ring or to use the ring to interconnect two or more objects.

A split ring comprising a piece of wire formed into two circular coils lying in tight back-to-back relation is well known as convenient means for attaching a variety of objects in a secure, but if necessary demountable, manner. Key rings are one example of the multitude of uses to which split rings are adapted. Split rings are also widely used in the assembly of many products, one of which is the currently popular remote control for keyless vehicle entry systems. The use of split rings for keyless entry remote controls may be to some extent a vestige of the key ring technology being replaced, but split rings still provide a convenient means by which the vehicle owner may retain conventional keys, identification tags, and the like with the remote control.

A split ring is typically characterized by two coils of a single length of wire formed back-to-back in a tight coil with the opposing surfaces flattened somewhat and the opposite free ends spaced by a small gap on opposite sides of the wire at the point of wire crossover from one coil to the other at approximately the midpoint along the wire. In any assembly technique, a narrow-edged tool is typically inserted into the split between the coils and adjacent one free end of the wire to allow the closed-loop objects intended to be attached to the ring to be slipped over the free end. Thereafter, the ring is simply rotated or turned with respect to the object approximately one complete turn to allow the object to travel along the split between the two coils until it reaches the opposite free end, whereupon the object completely encircles the ring coil and is secured thereto.

Equipment of various types has been developed to facilitate the assembly of objects to split rings. Such equipment has varied in complexity from a simple hand-held pliers device including a pointed tooth on one jaw to facilitate opening the split in the ring, to more complex semiautomatic assembly equipment which actually holds, positions, and opens a ring in a manner to allow an operator to handle only the object or objects to be attached to the ring. Examples of prior art devices are shown in U.S. Pat. Nos. 3,340,595 and 3,596,341. An improvement in semiautomatic assembly equipment is disclosed in U.S. Pat. No. 5,077,877, which apparatus can accurately and reliably handle a range of sizes of split rings to present the rings in sequence and in proper orientation for rapid operator-assisted assembly of an object or objects to the ring.

SUMMARY OF THE INVENTION

The present invention provides an improved split ring assembly apparatus which is particularly well adapted for high volume automated assembly of split rings to objects or to the interconnection of two or more objects with a split ring. The method of operation of the apparatus of the present invention also provides a unique approach to split ring assembly.

The apparatus operates to simultaneously turn and open a split ring in a manner which facilitates automated attachment of any closed perimeter object or objects to the ring. The apparatus includes a rotatable ring drive spindle which engages the circular rear face of a split ring. The spindle has a drive pin which defines a path of rotation on the arc of the circular face of the ring and the pin has an edge which engages the gap in the rear face of the ring in response to rotation of the drive spindle to turn the ring. A wedge is positioned to engage the front circular face of the ring and has a leading edge which is biased against the front face and positioned to enter the other ring gap in response to ring rotation to open the ring.

The apparatus preferably includes an outer housing having a cylindrical through bore. The drive spindle is cylindrical in shape and is mounted for independent rotational and axial movements in the through bore of the housing. The diameter of the drive spindle corresponds to the outside diameter of the split ring and the spindle includes an annular ring-engaging axial end. The drive pin is mounted on the axial end of the drive spindle and at the outer cylindrical surface thereof. The axial end of the drive spindle is provided with a flat circular face generally perpendicular to the spindle axis and a peripheral ring-receiving groove which surrounds the circular face. The peripheral groove in the end face of the spindle is shaped to conform to the rear face of the split ring. The drive pin extends into the peripheral groove.

The ring splitting wedge is pivotally attached to the housing on a pivot pin which is disposed with its axis generally radially extending with respect to the housing bore and the cylindrical drive spindle. The leading edge of the wedge is positioned generally parallel to the pivot pin axis and an axial outer wedge surface extends from the leading edge at an acute angle with respect to the plane of the split ring. The wedge is preferably provided with an inner wedge surface which extends from the leading edge generally parallel to the plane of the split ring, but has a recessed portion near the leading edge to provide clearance for the crossover portion of the split ring adjacent to the gap in the front face of the ring.

The housing includes a ring loading slot which extends laterally into the through bore and defines a delivery path to bring a split ring into alignment with the ring-engaging end of the spindle. An indexing device axially positions the drive spindle in the housing bore in the loading position with the ring-engaging end and the drive pin withdrawn from the delivery path, and an operative position in engagement with the rear face of the split ring.

In accordance with the method of the present invention, a conventional split ring is opened for assembly by the steps of (1) rotating the ring on the axis of its coils by engaging the wire end in the gap in one coil with a rotary pin, (2) positioning a wedge having a lead edge in biased contact with the coil on the opposite face of the ring and causing the edge to enter the gap in the coil on said opposite face, and (3) continuing to rotate the ring to cause the wedge to progressively separate one coil from the other.

BRIEF DESCRIPTION OF THE DRAWINGS

FIG. 1 is a perspective view of the assembled apparatus of the present invention.

FIG. 2 is a partial exploded perspective view of the FIG. 1 assembly with the drive spindle withdrawn from the housing and also showing a conventional split ring.

FIG. 3 is a generally vertical section taken on line 3—3 of FIG. 1.

FIG. 4 is an axial front elevation of the assembly shown in FIG. 1.

FIG. 5 is an enlarged perspective detail showing the cooperative arrangement of the drive pin and opening wedge in the rotation and opening of a split ring.

FIG. 6 is an enlarged sectional view taken on line 6—6 of FIG. 4.

FIG. 7 is a sectional detail taken on line 7—7 of FIG. 5.

FIG. 8 is an enlarged sectional detail taken on line 8—8 of FIG. 4.

DETAILED DESCRIPTION OF THE PREFERRED EMBODIMENT

Figure 2A:
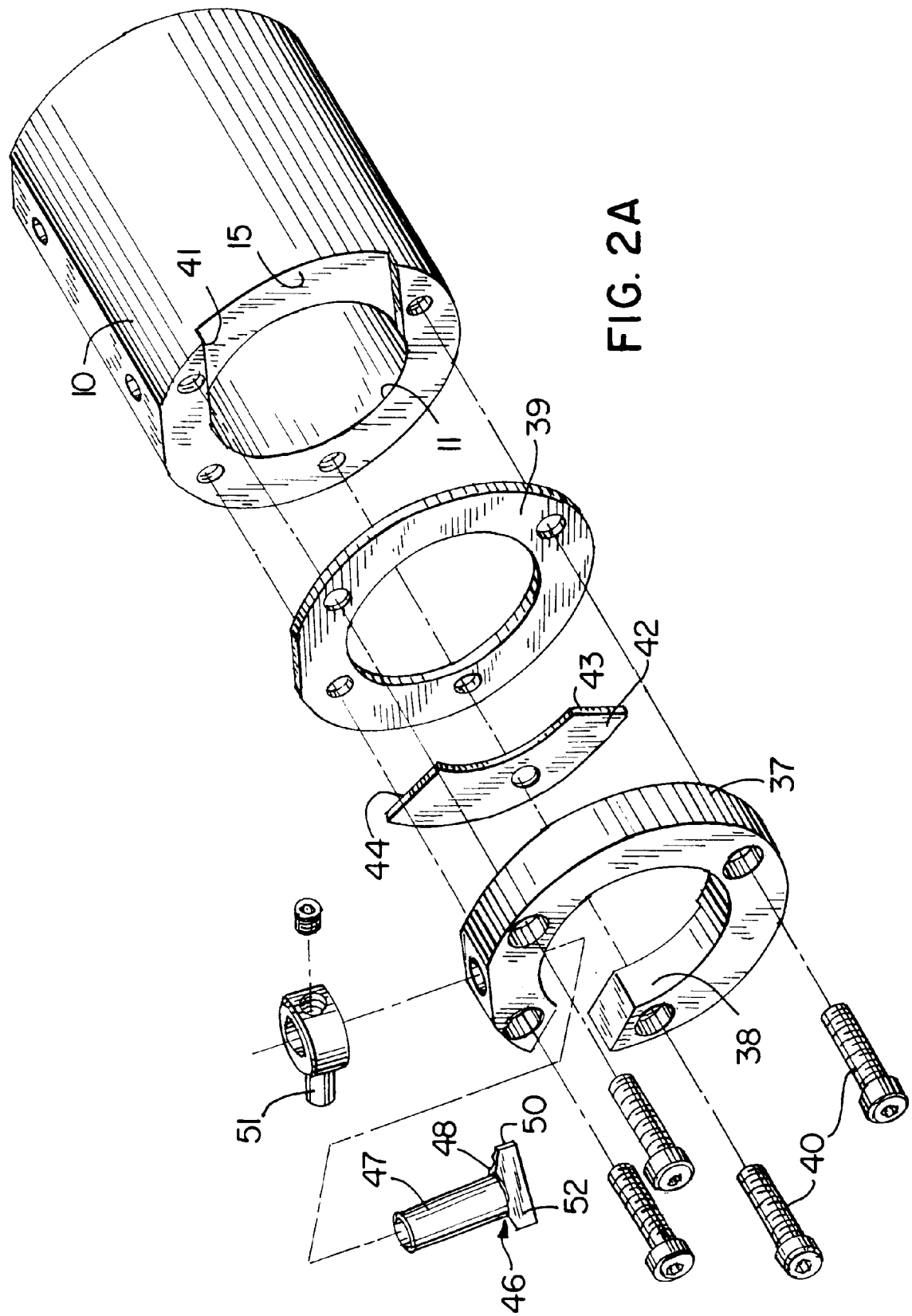
FIG. 2A is a full exploded perspective view of the housing and cover assemblies of FIGS. 1 and 2.

Referring initially to FIGS. 1, 2 and 2A, the split ring assembly apparatus of the present invention includes two main parts which are shown respectively in their operative assembled positions and disassembled to better show parts hidden by their assembly. The apparatus includes a tubular generally cylindrical outer housing 10 which is mounted in a fixed position on a suitable support (not shown) and is provided with a cylindrical through bore 11. A generally cylindrical drive spindle 12 has a cylindrical outer surface 13 just slightly smaller in diameter than the housing bore 11 such that the spindle may be mounted in the bore for independent rotational and axial movements therein. In its assembled position within the housing 10, the drive spindle 12 is rotated in the direction of the solid arrow shown in FIG. 2 to rotate a split ring 14 which has been previously fed into the housing through a ring loading slot 15, in a manner which will be described in greater detail below.

Referring particularly to FIG. 2 and also to FIG. 5, the conventional split ring 14 is typically made from a piece of circular cross section wire which is formed into two circular coils which, for purposes of split ring orientation in the assembly apparatus, will be referred to as the rear coil 16 and front coil 17. The coils also respectively define a rear face 18 and front face 20 of the split ring. The coils 16 and 17 define therebetween a longitudinal split 21 which runs nearly the full circumference of the ring. The ends 22 and 23 of the rear and front coils 16 and 17, respectively, each define a gap 24 or 25 which are separated by an angled crossover 26 that forms the transition between the rear and front coils 16 and 17. In the manufacture of a split ring, the initially coiled wire is coined to form generally flat surfaces 27 on the abutting rear and front coils 16 and 17 and to form the angled offset defined by the crossover 26, all in a manner well known in the art.

As also seen in FIG. 6, the wire is typically cut to provide coil ends 22 and 23 which are undercut such that the gaps 24 and 25 are in the shape of angled slots.

Referring again to FIGS. 1–3, the drive spindle 12 has a flat front face 28 which is surrounded at its outer edge by a peripheral radiused groove 30. The peripheral groove 30 is sized and shaped to receive the rear coil 16 of a split ring and to hold the ring in position within the housing bore 11 during most of the assembly operation. A ring drive pin 31 is mounted in a slot 32 cut in the cylindrical outer surface 13 of the drive spindle, which slot also opens into the peripheral groove 30 in the face of the spindle. The pin slot 32 is formed in the manner of a keyway and the drive pin 31 is like a key received therein. The pin is held in position by a clamping block received in a slot 34 cut in the drive spindle 12, with the block attached to the spindle by a suitable clamping screw (not shown). The drive pin is mounted to extend axially into the peripheral groove 30. The drive pin has a generally rectangular cross section and the free exposed end is cut to define an angled face 35 which terminates in an outermost drive edge 36.

The front axial end of the housing 10 is defined by a generally C-shaped cover 37 which has a cylindrical inner surface 38 of the same diameter as the through bore 11 of the housing. The cover 37 is attached to the front axial end of the housing with suitable machine screws 40. A recess 41 is cut into the front axial face of the housing and, with the face of a retaining washer 39 which is positioned between the abutting rear axial face of the cover 37 and the front face of the housing, defines the loading slot 15 through which split rings are delivered one at a time into the interior of the housing. Retaining washer 39 serves to prevent inadvertent reverse movement of the split ring out of the loading slot, as will be described below.

To provide unobstructed entry of a split ring 14 through the slot 15 and into the housing, the drive spindle 12 is withdrawn axially by an amount sufficient to assure that the flat face 28 of the spindle and the drive edge 36 of the drive pin 31 are fully retracted from the path of the incoming ring. Axial movement of the drive spindle within the housing 10 may be provided by a double acting pneumatic cylinder (not shown) which also operates to move the drive spindle in the other axial direction to initiate rotation of the split ring and maintain driving contact therewith as the ring is opened.

A thin semicircular retainer 42 is positioned between the front face of the retaining washer 39 and the rear face of the C-shaped cover 37, as may be seen in FIGS. 1, 2 and 2A. The retainer 42 extends radially into the housing bore to provide a wall or barrier for the split ring, and extends circumferentially through an arc of about 115° (FIG. 2A) from a lower end 43 at approximately the lower vertical position with the housing oriented as shown, to an upper end 44 which extends past and terminates just beyond an open notch 45 defined by the gap in the C-shaped cover 37 (see also FIG. 4). After a split ring 14 has entered the housing through the loading slot 15, indexing of the drive spindle 12 in a forward axial direction from its initial retracted position, will move the split ring axially forwardly a short distance into engagement with the retainer 42, such that the front coil 17 is encircled by the retaining washer 39 and the split ring cannot move laterally back through the slot 15. The split ring is held in the peripheral groove 30 and captured between the end of the spindle and the retainer 42.

Referring also to FIGS. 4–8, a ring opening wedge 46 is rotatably attached to the housing on a pivot pin 47 extending generally radially through the cover 37. The top surface 48 of the opening wedge is suitably curved on its upper surface to conform to the cylindrical inner surface 38 of the cover 37. The wedge includes a relatively sharp lead edge 50 positioned to engage the front face 20 of the split ring. The wedge 46 is biased rotationally on its pivot pin 47 to force the lead edge 50 into contact with the split ring. However, for loading a split ring into the housing, the wedge 46 is initially indexed rotationally in the opposite direction against the bias to move the wedge out of the path of the incoming split ring. For example, the pneumatic actuator which provides the initial axial indexing of the drive spindle 12 to clear the spindle and the drive pin 31 from the loading slot 15, may also be utilized to actuate a lever arm 51 attached to the radially outer end of the pivot pin 47 to index the wedge out of the loading slot as well.

With a split ring 14 received through the loading slot 15 into the housing 10, and without regard to the rotational positioning of the coil ends 22 and 23 and the respective gaps 24 and 25, the drive spindle 12 is indexed forwardly in the axial direction. As indicated, axial movement of the drive spindle may be effected by a suitable pneumatic actuator and, as a result of the random rotational orientation of the split ring, will likely bring the edge 36 of the drive pin 31 initially into contact with the rear coil 16 of the split ring. Simultaneously, the loading indexing force on the lever arm 51 of the wedge pivot pin is released allowing the opening wedge 46 to move into biasing contact with the front coil 17. A suitable rotary spindle drive (such as an electric gear motor or an air motor, not shown) is operated to rotate the drive spindle in the bore 11 of the housing in the direction shown by the arrow on the end face 28 shown in FIG. 2. Rotation of the spindle will cause the drive pin 31 to track along the coil 16 defining the rear face 18 of the split ring until the drive edge 36 of the pin reaches the crossover 26 (see FIG. 5) and, because of the forward axial bias imparted to the spindle, the drive pin will enter the rear gap 24 in the split ring and engage the end 22 of the rear coil 16. The coil will then become fully seated in the peripheral groove 30 in the face of the drive spindle and the split ring will begin to rotate with the spindle. When the drive pin reaches the approximately upper vertical position, the lead edge 50 of the opening wedge 46 (which has been riding in biased contact with the front coil 17) will ride along the crossover 26 and into the front gap 25 of the split ring. As the split ring continues to rotate, the front face 20 is retained by contact with the retainer 42, as well as biasing contact by the wedge 46. As the lead edge 50 of the wedge enters the front gap 25, the end 23 of the front coil 17 rides over the flat front face 52 of the wedge 46 to begin to open the ring along the split 21, as may be seen in FIGS. 5 and 6. The upper end 44 of the retainer 42 is positioned to lie closely adjacent the downstream end 53 of the wedge, so that the front end 23 of the coil 17 is transferred to the front of the retainer 42 as the ring continues to rotate while the remaining portion of the front coil 17, the crossover 26, and the initial portion of the rear coil 16 remain in contact with the rear face 55 of the retainer.

The notch 45 in the C-shaped cover 37 is positioned immediately downstream from the downstream end 53 of the wedge front face 52. As the end 23 of the front coil 17 of the ring rotates into the notch 45, it has been spread or split from the remainder of the ring by approximately the axial thickness of the wedge 46. A wedge angle of about 24° has been found to be suitable. Referring particularly to FIGS. 4 and 8, the item 56 to be assembled to the split ring 14 is inserted into the notch 45 in the housing cover so that the end 23 of the front coil 17 is received directly in the opening 57 in the item for assembly as the coil leaves the face 52 of the wedge. Continuing driven rotation of the split ring will cause the remainder of the front coil, followed by the rear coil 16 to pass over the upper end 44 of the retainer 42 and into the opening 57 in the item to be assembled. After one full ring revolution beyond initial entry of the lead edge 50 into the front gap 25, the lead edge will have reached the end 22 of the rear coil 16 at the rear gap 24. The flat front face 28 of the spindle is engaged by the rear face 60 of the wedge 46 and prevents the wedge from rotating into the path of the drive pin 31. Similarly, an axial spindle stop such as radial shoulder 58 prevents forward axial movement of the spindle and drive pin to a point where it could engage the upper end 44 of the retainer 42. At this point in rotation of the ring, the tail end 22 of the rear coil 16 is still positioned against the rear face 55 of the retainer 42 and remains there until the drive pin carries it past the lower end 43 of the retainer, at which point the split ring is fully within the opening 57 of the assembly item 56. Also, at this point, the ring is completely free of the retainer 42 and is free to exit axially through the open end of the C-shaped cover 37 with the attached item 56.

Referring particularly to FIGS. 6 and 8, the rear face 60 of the opening wedge 46 includes a short flat face portion 61 which is followed immediately by a curved recess 62. The curved recess receives the crossover bend and allows the lead edge 50 of the wedge to dip into the front gap 25 at the crossover 26 to assure positive entry of the wedge into the split. As indicated previously, the approximately 24° wedge angle provides a smooth opening of the split ring over a wedge face 52 of reasonable length. The apparatus of the subject invention is virtually immune from operational problems caused by inevitable tolerance variations in the manufacture of split rings. Dimensional variations in the raw material, variations resulting from heat treating of the finished products, as well as manufacturing variations, have all led to operational problems in prior custom split ring assembly machines.

I claim:

1. An apparatus for turning and opening a split ring to facilitate attachment of a closed perimeter object to the split ring, the split ring having an outside diameter and a central longitudinal axis, front and rear coils extending generally normal to and surrounding said central longitudinal axis, with each of said coils being separated by a split and having an end surface extending generally transverse to its respective coil, and with each of said coils defining a gap immediately adjacent each of said end surfaces, said apparatus comprising:

a rotatable ring drive including a drive pin having an edge that is receivable within the gap of said rear coil and engageable with the end surface of said rear coil upon rotation of said rotatable ring drive;

a wedge having a leading edge that is receivable within the gap of said front coil and enterable within said split upon rotation of said rotatable ring drive while said drive pin is engaged with the end surface of said rear coil; and means for biasing the leading edge of said wedge against said front coil in a direction parallel to said central longitudinal axis, whereby after said drive pin has engaged the end surface of said rear coil further rotation of said rotatable ring drive causes said split ring to rotate about said central longitudinal axis, such that the leading edge of said edge enters the gap of said front coil and then enters and travels along said split.

2. The apparatus as set forth in claim 1 wherein said rotatable ring drive comprises:

a housing having a cylindrical through bore; and a cylindrical drive spindle mounted for independent rotational and axial movements in said through bore, the diameter of said drive spindle corresponding to the outside diameter of the split ring, said cylindrical drive spindle having an annular ring-engaging axial end surface; wherein said drive pin is mounted on and extends from said cylindrical drive spindle, and is located radially outwardly from said annular ring-engaging axial end surface.

3. The apparatus as set forth in claim 2, wherein said cylindrical drive spindle further includes a flat circular face extending perpendicular to said central longitudinal axis, and wherein said annular ring-engaging axial end surface comprises a recessed region that surrounds and extends radially outwardly from said flat circular face.

4. The apparatus as set forth in claim 3, wherein said recessed region corresponds in shape to that of said rear coil.

5. The apparatus as set forth in claim 2, wherein said means for biasing includes a pivot pin having a pivot axis extending from said housing in a generally radial direction, wherein said wedge is attached to said pivot pin such that the leading edge of said wedge is disposed pivotable into said cylindrical through bore and extends generally parallel to said pivot axis, and wherein said wedge further includes an outer surface that extends from the leading edge at an acute angle relative to the split ring.

6. The apparatus as set forth in claim 5 wherein said wedge further includes an inner wedge surface extending from said leading edge generally parallel to the plane of the split ring, said inner wedge surface having a recessed portion to provide clearance for an angled crossover portion of the split ring adjacent the gap in the front coil.

7. The apparatus as set forth in claim 2 comprising:

a ring loading slot in said housing extending laterally into said through bore and defining a delivery path to deliver the split ring into alignment with the ring-engaging end of the spindle; and, an indexing device adapted to axially position said drive spindle in said housing bore in a loading position with said ring-engaging end and said drive pin withdrawn from said delivery path, and an operative position in engagement with the split ring.

8. The apparatus as set forth in claim 7 wherein said indexing device includes means for moving said wedge against its biased operative position out of said delivery path.

9. The apparatus as set forth in claim 2 and further comprising:

a semiannular retainer positioned in the housing axially adjacent the wedge and extending circumferentially from the wedge in the direction of ring rotation; and, said retainer having a face extending radially into the housing bore to initially engage the front face of the ring and to retain the ring against the drive spindle during ring rotation.

* * * * *